United States Patent
Hunter

(10) Patent No.: US 9,054,782 B2
(45) Date of Patent: *Jun. 9, 2015

(54) METHODS FOR CANCELING INTERFERING WIRELESS SIGNALS IN CABLE CUSTOMER PREMISES EQUIPMENT DEVICES AND OUTSIDE PLANT

(71) Applicant: Cable Television Laboratories, Inc., Louisville, CO (US)

(72) Inventor: David F. Hunter, Longmont, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,373

(22) Filed: Feb. 14, 2014

(65) Prior Publication Data

US 2015/0085909 A1    Mar. 26, 2015

Related U.S. Application Data

(63) Continuation-in-part of application No. 14/033,301, filed on Sep. 20, 2013.

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04B 3/46 | (2006.01) |
| H04B 17/00 | (2006.01) |

(52) U.S. Cl.
CPC ............. *H04B 3/462* (2013.01); *H04B 3/46* (2013.01); *H04B 17/00* (2013.01); *H04B 2203/5425* (2013.01)

(58) Field of Classification Search
CPC .......... H04B 3/462; H04B 3/46; H04B 17/00; H04B 2203/5425
USPC ................ 375/346, 284, 285, 350, 229, 232; 455/570, 296, 302, 307
See application file for complete search history.

(56) References Cited

U.S. PATENT DOCUMENTS 6,477,212 B1 * 11/2002 Bingel et al. ............... 375/346
8,103,235 B2 * 1/2012 Shiotsu et al. .............. 455/296

OTHER PUBLICATIONS

U.S. Appl. No. 14/033,301, filed Sep. 20, 2013.*

*Primary Examiner* — Phuong Phu
(74) *Attorney, Agent, or Firm* — Davis Wright Tremaine LLP; James S. Hsue; Heather M. Colburn

(57) ABSTRACT

A noise reduction device for use with a cable signal distributed by an outside plant of a cable system. The device includes an antenna and a signal processing system. The outside plant receives an interfering radio frequency ("RF") signal generated by one or more external wireless signal sources and combines the interfering RF signal with the cable signal to produce a noisy cable signal. The antenna receives the interfering RF signal as a copy signal. The signal processing system modifies the copy signal to produce a processed copy signal, and combines the noisy cable signal and the processed copy signal to produce a combined signal. The signal processing system also monitors error rate values of the combined signal, and adjusts the copy signal such that the copy signal at least partially cancels the interfering RF signal in the combined signal thereby reducing the error rate values of the combined signal.

21 Claims, 5 Drawing Sheets ns would be particularly desirable. The present application provides these and other advantages as will be apparent from the following detailed description and accompanying figures.

METHODS FOR CANCELING INTERFERING WIRELESS SIGNALS IN CABLE CUSTOMER PREMISES EQUIPMENT DEVICES AND OUTSIDE PLANT

CROSS REFERENCE TO RELATED APPLICATION(S)

This application is a continuation-in-part of U.S. patent application Ser. No. 14/033,301, titled METHOD FOR CANCELING INTERFERING WIRELESS SIGNALS IN CABLE CUSTOMER PREMISES EQUIPMENT DEVICES, filed on Sep. 20, 2013, which is incorporated herein by reference in its entirety.

BACKGROUND OF THE INVENTION

1. Field of the Invention

The present invention is directed generally to systems and methods for reducing or eliminating effects of interfering radio frequency signals on cable customer premises equipment devices and outside plant.

2. Description of the Related Art

It has been reported that cable customer premises equipment ("CPE") devices, such as cable set-top-boxes, cable modems, and embedded multimedia terminal adapters ("EMTAs"), are experiencing problems functioning properly in the presence of wireless telephones because wireless telephones introduce interfering radio frequency ("RF") signals into the CPE devices. While many CPE devices include shielding that helps reduce such interfering wireless signals inside the CPE devices, the amplitudes of some strong wireless signals (e.g., RF signals used by wireless Long Term Evolution ("LTE") cellular telephones) are large enough to cause signal-processing problems in the CPE devices. Further, retail grade cable and RF splitters used by some people in their homes can be highly susceptible to RF interference. Thus, cable and RF splitters may receive interfering signals and function as a point of ingress into CPE devices for interfering signals.

Currently available methods of dealing with problems caused by interfering RF signals involve either abandoning the use of some frequencies (e.g., those experiencing significant RF interference) by a cable system, and/or increasing the shielding of the CPE devices. Abandoning the use of some frequencies is undesirable because doing so reduces data bandwidth and the number of video channels available to customers. Unfortunately, increasing the shielding of the CPE devices simply does not provide enough isolation from the interfering RF signal in some cases.

A similar problem occurs in the outside plant portion of a cable television distribution systems. In recent years, the Federal Communications Commission has been allocating larger and larger portions of frequency spectrum used by cable television distribution systems to wireless service providers. Thus, wireless transmissions originating from such wireless service providers may interfere with cable signals distributed by the outside plant. Additionally, interfering signals (e.g., signals broadcast on the same frequency or frequencies used by cable television distribution systems) originating from other transmitting devices (such as broadcast television stations) may introduce noise into cable signals. While the various components of the outside plant may include shielding, some interfering signals may nevertheless be received by the outside plant and may introduce noise into the cable signals distributed by the outside plant. In some cases, it is not practical to increase the shielding to eliminate the interference.

Therefore, a need exists for methods of reducing and/or eliminating interfering signals in the outside plant and/or CPE devices. Noise reduction devices and/or CPE devices configured to operate in the presence of strong wireless signals would be particulary desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
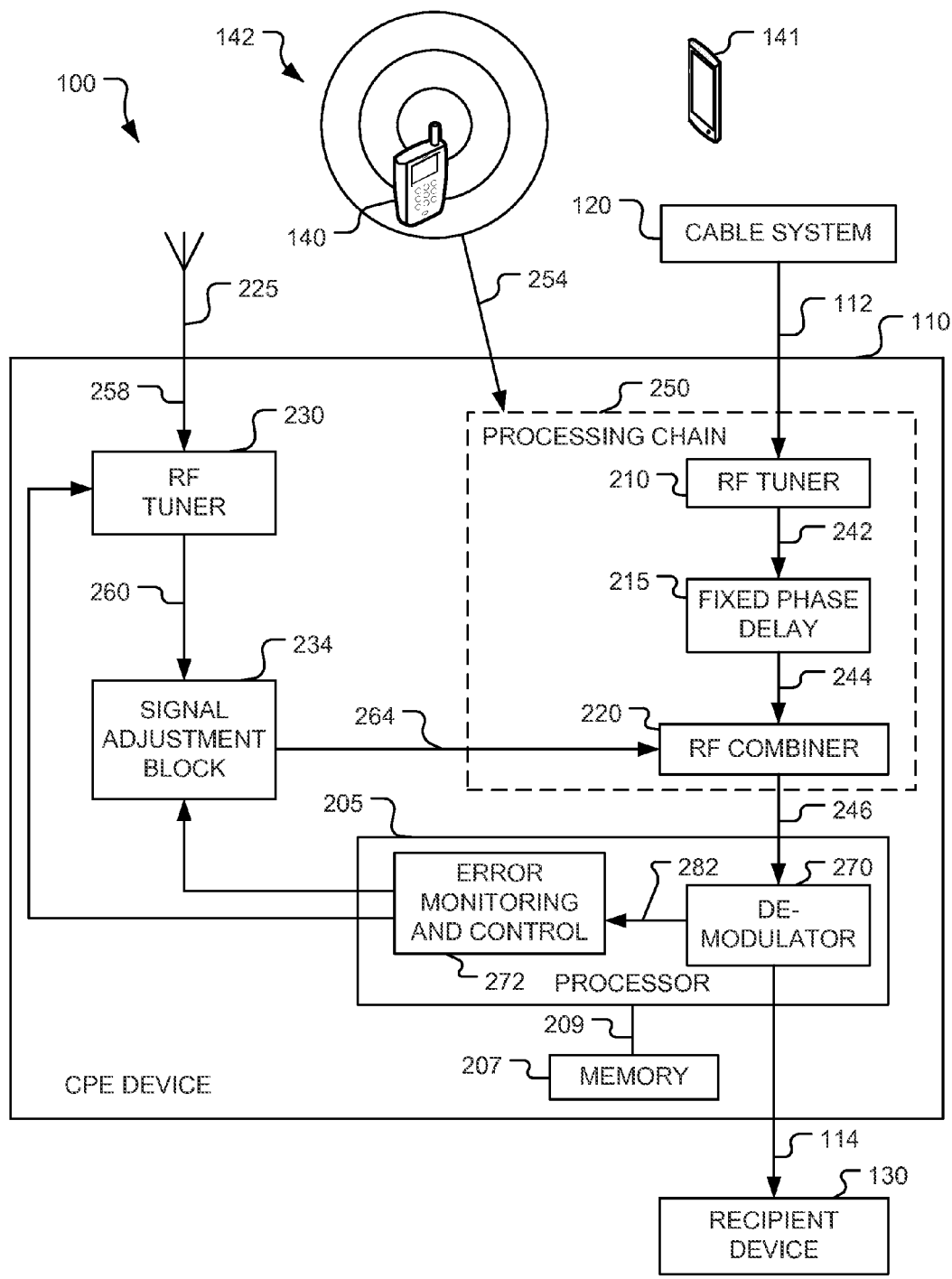
FIG. 1 is a block diagram of a system that includes an exemplary CPE device that receives a cable signal from an exemplary cable system, and an interfering signal from one or more wireless signal sources.

FIG. 1 is a block diagram of a system 100 including an exemplary customer premises equipment ("CPE") device 110 connected to an exemplary cable system 120. While FIG. 1 illustrates the single CPE device 110, those of ordinary skill in the art appreciate that a plurality of CPE devices like the CPE device 110 may be connected to the cable system 120. The cable system 120 may include any conventional cable system configured to transmit a cable signal (illustrated by the arrow 112) to the CPE device 110. The CPE device 110 may include or be connected to a recipient device 130. The CPE device 110 receives the cable signal (illustrated as arrow 112) from the cable system 120, processes the cable signal to produce a processed signal (illustrated as arrow 114), and provides the processed signal to the recipient device 130. The recipient device 130 may be a display device configured to generate a display viewable by a user (not shown) based at least in part on the processed signal (illustrated as the arrow 114). By way of a non-limiting example, the recipient device 130 may be implemented as a television set, a computing device (e.g., a personal computer), and the like. As is apparent to those of ordinary skill in the art, the CPE device 110 and the recipient device 130 may be combined into a single device (not shown).

One or more external wireless signal sources (e.g., a cellular telephone 140, a cellular telephone 141, and the like) may generate wireless or RF signals (e.g., RF signals 142). Non-limiting examples of external wireless signal sources include cellular telephones and the like. By way of a non-limiting example, the cellular telephone 140 may be configured to communicate using the Long Term Evolution ("LTE") standard, and the RF signals 142 may be LTE signals.

The CPE device 110 may receive the RF signals (e.g., the RF signals 142) generated by the one or more wireless signal sources (e.g., the cellular telephone 140, the cellular telephone 141, and the like) as an interfering signal (illustrated as arrow 254) that combines with the cable signal (illustrated as arrow 112). This combination may negatively affect the quality of the processed signal (illustrated as arrow 114) provided to the recipient device 130. The interfering signal (illustrated as arrow 254) may be received by the CPE device 110 and/or components connected to the CPE device 110 (such as RF splitters, cables, and the like) that transmit the interfering signal or a portion thereof to the CPE device 110. For ease of illustration, the interfering signal (illustrated as arrow 254) will be described as being received by the CPE device 110.

By way of a non-limiting example, the CPE device 110 may be implemented as a cable set-top-box, a television set, a cable modem, an EMTA, a computing device (e.g., a personal computer), and the like. The CPE device 110 includes a processor 205, memory 207, a first RF tuner 210, a fixed phase delay 215, a RF combiner 220, an antenna 225, a second RF tuner 230, and a signal adjustment block 234.

Figure 4:
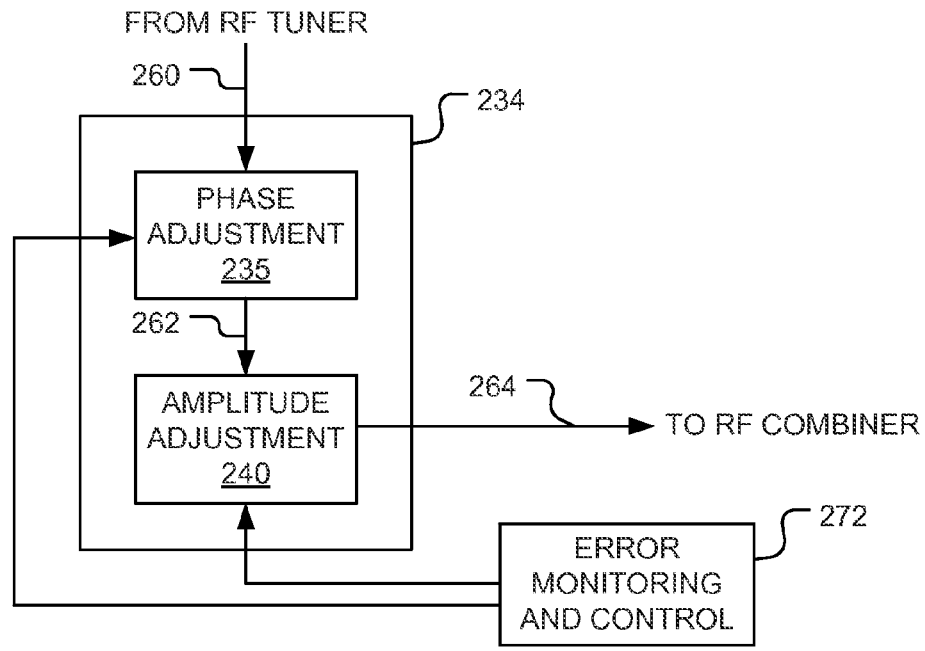
FIG. 4 is an exemplary embodiment of a signal adjustment block of the CPE device of FIG. 1.

Referring to FIG. 4, by way of a non-limiting example, the signal adjustment block 234 may include a phase adjustment 235, and an amplitude adjustment 240. In such embodiments, the signal adjustment block 234 is configured to adjust both phase and amplitude (or gain) of a signal. By way of another non-limiting example, referring to FIG. 1, the signal adjustment block 234 may be configured to enable multiple delay taps. Such implementations may be useful for canceling noise when the interfering signal (illustrated as arrow 254) is received along multiple paths or when channel distortions are present (e.g., in the cable signal illustrated as arrow 112).

The first RF tuner 210, the fixed phase delay 215, the RF combiner 220, the second RF tuner 230, the phase adjustment 235, the amplitude adjustment 240, the processor 205, and the memory 207 may be characterized as being signal processing components. The first RF tuner 210, and the signal adjustment block 234 may be characterized as being signal adjustment components.

The first RF tuner 210 determines the frequency or frequencies on which the CPE device 110 receives the cable signal (illustrated as arrow 112) from the cable system 120. The first RF tuner 210 supplies the received cable signal to the fixed phase delay 215 as an RF signal (illustrated as arrow 242). The fixed phase delay 215 delays the RF signal (illustrated as arrow 242) by a fixed amount, and outputs a phase delayed signal (illustrated as arrow 244) to the RF combiner 220. For ease of illustration, the phase delayed signal (illustrated as arrow 244) will be referred to as a processed cable signal. As will be described in detail below, the RF combiner 220 outputs a combined signal (illustrated as arrow 246) to the processor 205.

Together the first RF tuner 210, the fixed phase delay 215, and the RF combiner 220 may be characterized as being a signal processing chain 250. Unfortunately, the processing chain 250 also receives the interfering signal (illustrated as arrow 254). Thus, the combined signal (illustrated as arrow 246) includes the processed cable signal (illustrated as arrow 244), and the interfering signal (illustrated as arrow 254) received by the processing chain 250.

The antenna 225 is configured to receive the RF signals (e.g., the RF signals 142) generated by the one or more interfering wireless signal sources (e.g., the cellular telephone 140, the cellular telephone 141, and the like). Thus, the antenna 225 receives a copy of the same RF signals that are received by (and interfere with) the processing chain 250. For ease of illustration, the signal(s) received by the antenna 225 will be referred to as a "copy signal" (illustrated as arrow 258). As is apparent to those of ordinary skill in the art, the copy signal has a plurality of signal parameters, such as an amplitude value, an amount of phase shift, an amount of attenuation, and the like.

The antenna 225 supplies the copy signal (illustrated as arrow 258) to the second RF tuner 230. The second RF tuner 230 determines the frequency or frequencies on which the CPE device 110 receives the copy signal (illustrated as arrow 258), and supplies the received copy signal to the signal adjustment block 234 as an RF signal (illustrated as arrow 260). The signal adjustment block 234 adjusts the RF signal (illustrated as arrow 260), and outputs a processed copy signal (illustrated as arrow 264) to the RF combiner 220.

Referring to FIG. 4, in embodiments in which the signal adjustment block 234 includes the phase adjustment 235, and the amplitude adjustment 240, the phase adjustment 235 adjusts the phase of the RF signal (illustrated as arrow 260), and outputs a phase adjusted signal (illustrated as arrow 262) to the amplitude adjustment 240. The amplitude adjustment 240 adjusts the amplitude of the phase adjusted signal (illustrated as arrow 262), and outputs a phase and amplitude adjusted signal as the processed copy signal (illustrated as arrow 264) to the RF combiner 220 (see FIG. 1).

Returning to FIG. 1, the RF combiner 220 combines the processed copy signal (illustrated as arrow 264) with the processed cable signal (illustrated as arrow 244) and, if present, the interfering signal (illustrated as arrow 254) received by the processing chain 250. Thus, the combined signal (illustrated as arrow 246) may have three components: (1) the processed cable signal (illustrated as arrow 244); (2) the processed copy signal (illustrated as arrow 264); and (3) the interfering signal (illustrated as arrow 254).

The processor 205 receives the combined signal (illustrated as arrow 246) from the RF combiner 220, and adjusts the processed copy signal (illustrated as arrow 264) to at least partially cancel out the interfering signal (illustrated as arrow 254). The processor 205 may be implemented by a microprocessor, microcontroller, application-specific integrated circuit ("ASIC"), digital signal processor ("DSP"), or the like. The processor 205 may be integrated into an electrical circuit, such as a conventional circuit board, that supplies power to the processor 205. The processor 205 may include internal memory and/or the memory 207 may be coupled thereto. The present invention is not limited by the specific hardware component(s) used to implement the processor 205 and/or the memory 207.

The memory 207 is a computer readable medium that includes instructions or computer executable components that are executed by the processor 205. The memory 207 may be implemented using transitory and/or non-transitory memory components. The memory 207 may be coupled to the processor 205 by an internal bus 209.

The memory 207 may comprise random access memory ("RAM") and read-only memory ("ROM"). The memory 207 contains instructions and data that control the operation of the processor 205. The memory 207 may also include a basic input/output system ("BIOS"), which contains the basic routines that help transfer information between elements within the CPE device 110.

Optionally, the memory 207 may include internal and/or external memory devices such as hard disk drives, floppy disk drives, and optical storage devices (e.g., CD-ROM, R/W CD-ROM, DVD, and the like). The CPE device 110 may also include one or more I/O interfaces (not shown) such as a serial interface (e.g., RS-232, RS-432, and the like), an IEEE-488 interface, a universal serial bus ("USB") interface, a parallel interface, and the like, for the communication with removable memory devices such as flash memory drives, external floppy disk drives, and the like.

In the embodiment illustrated, the processor 205 implements a demodulator 270, and an error monitoring and control block 272. While the demodulator 270, and the error monitoring and control block 272 have been illustrated as separate functional blocks, in alternate embodiments, the demodulator 270, and the error monitoring and control block 272 may be combined into a single functional block. Further, the functionality attributed to the demodulator 270, and the error monitoring and control block 272 may be divided into any suitable number of separate functional blocks.

The processor 205 is configured to execute software implementing the demodulator 270, and the error monitoring and control block 272. Such software may be implemented by computer executable instructions stored in memory 207. For example, the memory 207 may store instructions executable by the processor 205 that when executed cause the CPE device 110 to perform a method 300 (see FIG. 2), a method 330 (see FIG. 3), and/or a method 400 (see FIG. 5) described below.

The demodulator 270 receives the combined signal (illustrated as arrow 246), and demodulates the combined signal to produce a data stream (not shown). The processor 205 may process the data stream to produce the processed signal (illustrated as arrow 114), which is transmitted by the processor 205 to the recipient device 130. The processed signal (illustrated as arrow 114) may include audio and video signals that are displayable by the recipient device 130. The demodulator 270 may be configured to perform forward error correction on the combined signal (illustrated as arrow 246). In such embodiments, the demodulator 270 may occasionally (e.g., periodically) calculate an error rate value, and transmit the error rate value to the error monitoring and control block 272. Thus, a series of error rate values (illustrated as arrow 282) may be received by the error monitoring and control block 272 as an error rate signal. While the demodulator 270 is described as implementing forward error correction, this is not a requirement. Alternatively, forward error correction processing may be implemented in a separate functional block in the CPE device 110. By way of another non-limiting example, the error monitoring and control block 272 may determine the error rate values of the combined signal (illustrated as arrow 246).

The error monitoring and control block 272 monitors the error rate values of the combined signal (illustrated as arrow 246), and determines whether to modify the processed copy signal (illustrated as arrow 264) in a manner that at least partially cancels the interfering signal (illustrated as arrow 254) present in the combined signal to thereby reduce the error rate values of the combined signal. The error monitoring and control block 272 may modify the processed copy signal (illustrated as arrow 264) by instructing the signal adjustment block 234 to modify one or more signal parameters of the RF signal (illustrated as arrow 260). Together, the error monitoring and control block 272 and the signal adjustment block 234 may implement one or more adaptive filters. Examples of adaptive filters that may be implemented include filters configured to reduce or eliminate noise by adjusting phase, adjusting amplitude, implementing multiple delay taps, combinations thereof, and the like.

For example, referring to FIG. 4, the error monitoring and control block 272 may modify the processed copy signal (illustrated as arrow 264) by instructing the phase adjustment 235 to modify the amount of phase shift applied to the RF signal (illustrated as arrow 260), and/or instructing the amplitude adjustment 240 to modify the amount of amplitude adjustment applied to the phase adjusted signal (illustrated as arrow 262).

Returning to FIG. 1, the first RF tuner 210, the fixed phase delay 215, the RF combiner 220, the second RF tuner 230, the signal adjustment block 234, the demodulator 270, and the error monitoring and control block 272 are functional blocks. The functions of each of these functional blocks may be implemented in a number of different ways, such as in hardware and/or in software. Further, as is appreciated by those of ordinary skill in the art, the functions attributed to these functional blocks may be combined into one or more functional blocks, and/or distributed differently in any number of functional blocks.

Figure 2:
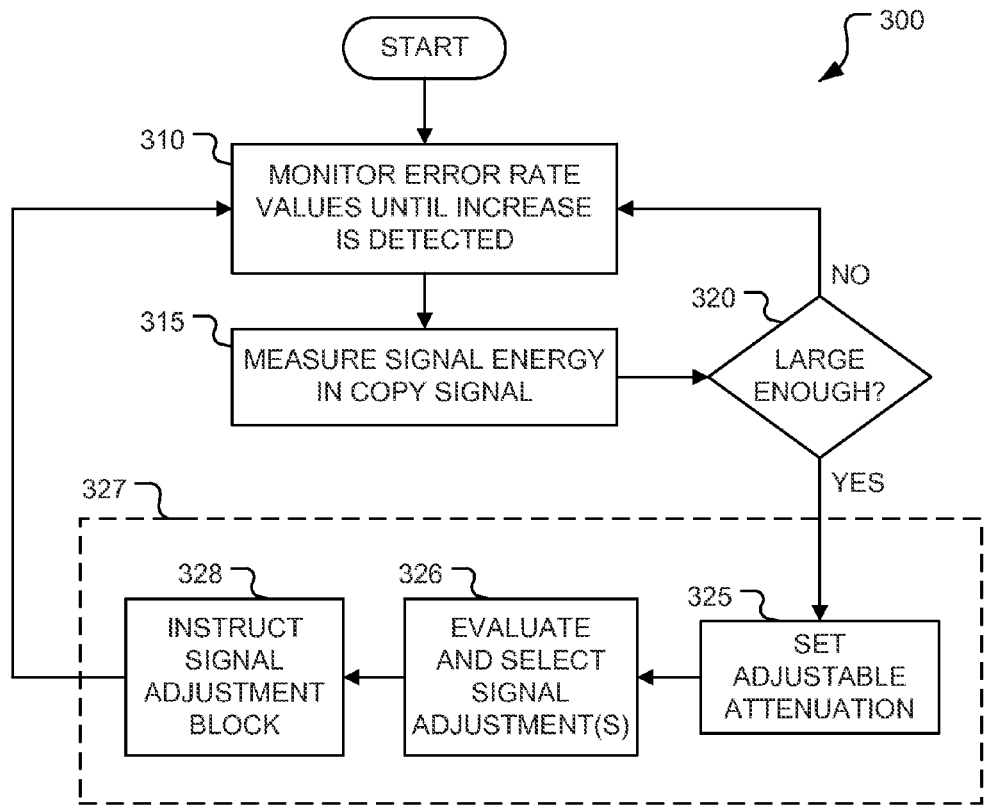
FIG. 2 is a flow diagram of a method of reducing the effects of the interfering signal on the cable signal.

FIG. 2 is a flow diagram of the method 300 of modifying the processed copy signal (illustrated as arrow 264) to at least partially cancel the interfering signal (illustrated as arrow 254) in the combined signal (illustrated as arrow 246). The method 300 may be performed by the processor 205. For ease of illustration, the method 300 may be described as being performed by the error monitoring and control block 272.

In first block 310, the error monitoring and control block 272 monitors the error rate values (illustrated as arrow 282) received from the demodulator 270 until an increase in the error rate values is detected. By way of a non-limiting example, the error monitoring and control block 272 may detect an increase has occurred when the error rate values exceeds a threshold amount.

In next block 315, the error monitoring and control block 272 measures signal energy of the copy signal (illustrated as arrow 258). By way of a non-limiting example, the second RF tuner 230 may measure the signal energy and provide it to the error monitoring and control block 272.

In decision block 320, the error monitoring and control block 272 determines whether the signal energy is large enough to be causing the increase in the error rate values. The decision in decision block 320 is "NO" when the error monitoring and control block 272 determines the signal energy is not large enough. In other words, when the decision is "NO," the increase in the error rate values is being caused by factors other than local noise ingress. On the other hand, the decision in decision block 320 is "YES" when the error monitoring and control block 272 determines the signal energy is large enough to be causing to be causing the increase in the error rate values.

By way of a non-limiting example, the decision in decision block 320 may be "YES," when the signal energy exceeds a predetermined threshold value. If the signal energy does not exceed the predetermined threshold value, decision in decision block 320 may be "NO."

When the decision in decision block 320 is "NO," the error monitoring and control block 272 returns to block 310 to continue monitoring the error rate values.

When the decision in decision block 320 is "YES," the error monitoring and control block 272 advances to block 325 to begin a noise cancellation process 327 portion of the method 300. In block 325, the error monitoring and control block 272 sets the adjustable attenuation of the copy signal (illustrated as arrow 258). By way of a non-limiting example, the signal adjustment block 234 may be configured to attenuate the copy signal (illustrated as arrow 258) in response to an instruction from the error monitoring and control block 272. In such embodiments, the error monitoring and control block 272 instructs the signal adjustment block 234 to set the amount of attenuation of the copy signal (illustrated as arrow 258) such that the signal energy of the copy signal is approximately equal to the average signal energy of the interfering signal (illustrated as arrow 254) received by the CPE device 110 at the operating frequency. In embodiments in which the signal adjustment block 234 includes the amplitude adjustment 240 (see FIG. 4), the amplitude adjustment 240 may attenuate the copy signal.

In block 326, the error monitoring and control block 272 evaluates a plurality of signal adjustment options and selects one or more signal adjustments. Then, in block 328, the error monitoring and control block 272 instructs the signal adjustment block 234 to apply the selected signal adjustment(s) to the RF Signal (illustrated as arrow 260).

At this point, the processed copy signal (illustrated as arrow 264) and the interfering signal (illustrated as arrow 254) components of the combined signal (illustrated as arrow 246) are substantially canceling one another. To continue monitoring the combined signal, the error monitoring and control block 272 returns to block 310. If at any point during the noise cancellation process 327 portion of the method 300, the signal energy of the copy signal (illustrated as arrow 258) goes to zero (or falls below a predefined threshold value), the error monitoring and control block 272 may return to block 310.

By performing the method 300, the error monitoring and control block 272 continuously monitors the combined signal (illustrated as arrow 246), and when appropriate, adjusts the copy signal in a feedback loop based on the error rate values of the combined signal.

Figure 3:
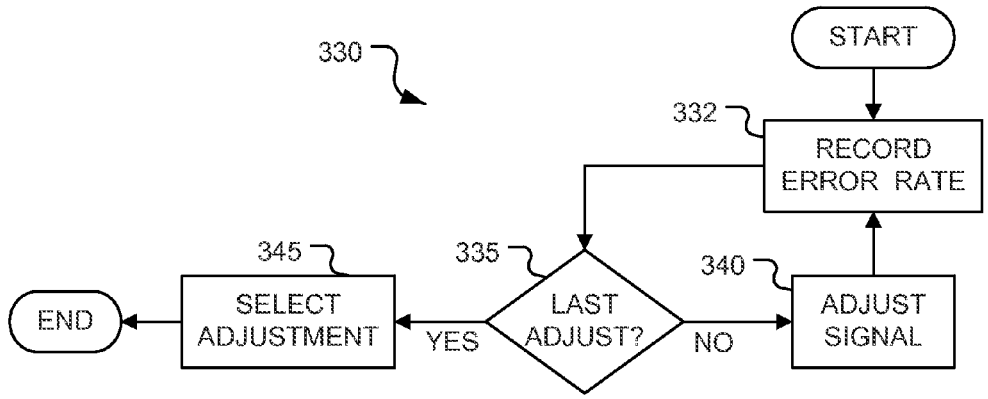
FIG. 3 is a first embodiment of a method that may be performed in block 326 of the method of FIG. 2.

FIG. 3 is a flow diagram of a method 330 that may be performed in block 326 of the method 300. The method 330 may be performed by the processor 205. For ease of illustration, the method 330 may be described as being performed by the error monitoring and control block 272.

In first block 332, the error monitoring and control block 272 records the error rate value (e.g., in the memory 207) received after the amount of attenuation of the copy signal is set in block 325 of the method 300.

In decision block 335, the error monitoring and control block 272 determines whether all available signal adjustment options have been evaluated. The decision in decision block 335 is "NO" when the error monitoring and control block 272 determines at least one available signal adjustment option has not been evaluated. On the other hand, the decision in decision block 335 is "YES" when the error monitoring and control block 272 determines all available signal adjustment options have been evaluated.

When the decision in decision block 335 is "NO," in block 340, the error monitoring and control block 272 instructs the signal adjustment block 234 to modify the RF signal (illustrated as arrow 260) in accordance with a previously unevaluated signal adjustment option. Then, the error monitoring and control block 272 returns to block 332, and records the error rate value (e.g., in the memory 207) received after the RF signal was adjusted in block 340.

When the decision in decision block 335 is "YES," in block 345, the error monitoring and control block 272 selects the signal adjustment option that produced the lowest error rate value recorded (in block 332). Then, the method 330 terminates.

Figure 5:
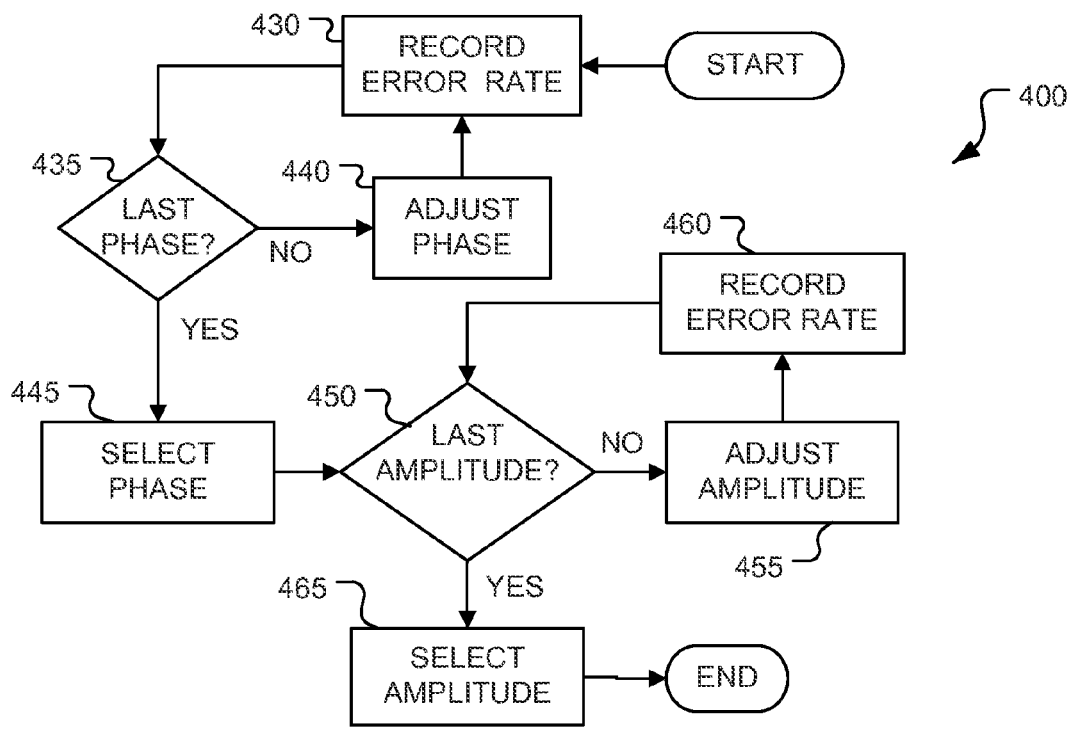
FIG. 5 is a second embodiment of a method that may be performed in block 326 of the method of FIG. 2.

FIG. 5 is a flow diagram of a method 400 that may be performed in block 326 of the method 300 when (as in FIG. 4) the signal adjustment block 234 includes the phase adjustment 235 and the amplitude adjustment 240. The method 400 may be performed by the processor 205. For ease of illustration, the method 400 will be described as being performed by the error monitoring and control block 272.

In block 430, the error monitoring and control block 272 records the error rate value (e.g., in the memory 207) received after the amount of attenuation of the copy signal is set in block 325 of the method 300 illustrated in FIG. 2.

Referring to FIG. 5, in decision block 435, the error monitoring and control block 272 determines whether all available phase values have been evaluated. The decision in decision block 435 is "NO" when the error monitoring and control block 272 determines at least one available phase value has not been evaluated. On the other hand, the decision in decision block 435 is "YES" when the error monitoring and control block 272 determines all available phase values have been evaluated.

When the decision in decision block 435 is "NO," in block 440, the error monitoring and control block 272 instructs the phase adjustment 235 to modify the amount of phase shift applied to the RF signal (illustrated as arrow 260). Then, the error monitoring and control block 272 returns to block 430, and records the error rate value (e.g., in the memory 207) received after the amount of phase shift was adjusted in block 440.

When the decision in decision block 435 is "YES," in block 445, the error monitoring and control block 272 selects the amount of phase shift that produced the lowest error rate value recorded (in block 430). Then, the error monitoring and control block 272 instructs the phase adjustment 235 to apply the selected amount of phase shift to the RF Signal (illustrated as arrow 260).

The process performed by blocks 430-445 tries to adjust the processed copy signal (illustrated as arrow 264) such that the processed copy signal is approximately 180 degrees out of phase with the interfering signal (illustrated as arrow 254). In other words, blocks 430-445 try to adjust the phase of the processed copy signal so that it at least partially cancels out the interfering signal in the combined signal (illustrated as arrow 246).

By way of a non-limiting example, the amount of phase shift applied to the RF signal (illustrated as arrow 260) may be set to an initial phase shift amount. Then, in block 440, the initial phase shift amount may be increased (or decreased) by an incremental amount. Blocks 430-440 repeat until a final phase shift amount is reached. Then, in block 445, the error monitoring and control block 272 selects the phase shift amount that provided the lowest error rate value.

To improve the amount of cancelation, the amplitude of the processed copy signal and the amplitude of the interfering signal should match (or be substantially similar). This is achieved by blocks 450-465 of the method 400.

In decision block 450, the error monitoring and control block 272 determines whether all available amplitude values have been evaluated. The decision in decision block 450 is "NO" when the error monitoring and control block 272 determines at least one available amplitude value has not been evaluated. On the other hand, the decision in decision block 450 is "YES" when the error monitoring and control block 272 determines all available amplitude values have been evaluated.

When the decision in decision block 450 is "NO," in block 455, the error monitoring and control block 272 instructs the amplitude adjustment 240 to modify the amplitude value applied to the to the phase adjusted signal (illustrated as arrow 262). Then, the error monitoring and control block 272 advances to block 460, and records the error rate value (e.g., in the memory 207) received after the amplitude value was adjusted in block 455.

When the decision in decision block 450 is "YES," in block 465, the error monitoring and control block 272 selects the amplitude value that produced the lowest error rate value recorded (in block 460). Then, the method 400 terminates.

By way of a non-limiting example, after block 445, the amplitude value may be set to an initial amplitude value. Then, in block 455, the initial amplitude value may be increased (or decreased) by an incremental amount. Blocks 450-460 repeat until a final amplitude value is reached. Then, in block 465, the amplitude value that is closest to the amplitude value of the interfering signal may be selected by selecting the amplitude value that provided the lowest error rate value.

After the method 400 has terminated, in block 328 of the method 300 illustrated in FIG. 2, the error monitoring and control block 272 instructs the phase adjustment 235 to apply the amount of phase shift selected in block 445 to the RF Signal (illustrated as arrow 260), and instructs the amplitude adjustment 240 to apply the amplitude value selected in block 465 to the phase adjusted signal (illustrated as arrow 262).

By performing the method 400 in block 326 of the method 300 illustrated in FIG. 2, the error monitoring and control block 272 continuously monitors the combined signal, and when appropriate, adjusts the amplitude value and/or the amount of phase shift of the copy signal in a feedback loop based on the error rate values of the combined signal (illustrated as arrow 246).

By using the CPE device 110, cable companies may continue effectively using RF spectrum in their cable systems that coincides with licensed wireless spectrum. Use of this spectrum by the cable companies may be critical to business models that include providing a desired amount of data bandwidth and/or a desired number of video channels to customers.

Figure 6:
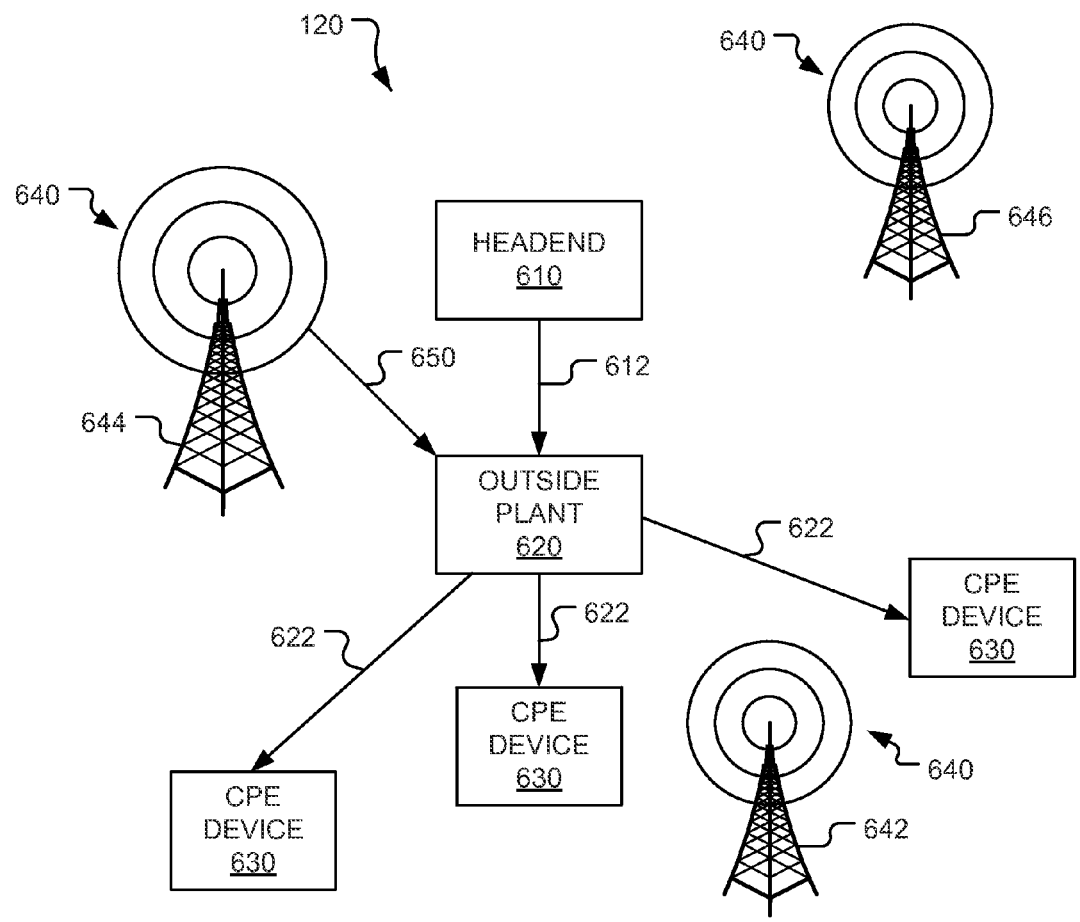
FIG. 6 is a block diagram of the exemplary cable system of FIG. 1, which includes an outside plant that receives an interfering signal from one or more wireless signal sources.

Referring to FIG. 6, the exemplary cable system 120 may be characterized as including a headend 610 and an outside plant 620. The headend 610 receives signals (e.g., television signals), and processes them for distribution over the outside plant 620. In FIG. 6, an exemplary cable signal delivered to the outside plant 620 by the headend 610 is illustrated by arrow 612. For ease of illustration, the cable signal illustrated by arrow 612 will be referred to as an "original cable signal."

The outside plant 620 delivers cable signals (illustrated by arrows 622) to a plurality of CPE devices 630. The CPE device 110 illustrated in FIG. 1 may be used to implement one or more of the CPE devices 630. For ease of illustration, the cable signals illustrated by arrows 622 will be referred to as "delivered cable signals." The delivered cable signals may include the cable signal illustrated by the arrow 112 in FIG. 1.

The outside plant 620 includes hardware components, such as cables, optical nodes, RF amplifiers, signal splitters, RF taps, other electrical components, and the like. While the various components of the outside plant 620 may include shielding (not shown), some interfering signals may nevertheless be received by the outside plant 620. Thus, like the CPE device 110 (see FIG. 1), one or more components of the outside plant 620 may receive interfering signals 640 from one or more external wireless signal sources (e.g., radio towers 642-646).

Non-limiting examples of external wireless signal sources that may interfere with the outside plant 620 include broadcast television stations, cellular phone systems, other transmitting devices, combinations thereof, and the like. Some of these external wireless signal sources transmit RF signals at the same frequency or frequencies used by the outside plant 620. While in FIG. 6, the exemplary external wireless signal sources have been illustrated as the radio towers 642-646, the outside plant 620 may receive interfering signals from other sources of interference (e.g., the cellular telephone 140 and the cellular telephone 141 illustrated in FIG. 1).

For ease of illustration, in FIG. 6, the outside plant 620 is illustrated receiving an interfering signal (illustrated as arrow 650) from the radio tower 644. However, as is appreciated by those of ordinary skill in the art, the outside plant 620 may receive multiple interfering signals. Further, as is also apparent to those of ordinary skill in the art, the outside plant 620 may be large and encompass many square miles. Therefore, different portions of the outside plant 620 may receive different interfering signals.

Inside the outside plant 620, the interfering signal (illustrated as arrow 650) combines with the original cable signal (illustrated by arrow 612) received by the outside plant 620. Thus, the delivered cable signals (illustrated by arrows 622) include both the interfering signal and the original cable signal. This combination may negatively affect the quality of the delivered cable signals.

Figure 7:
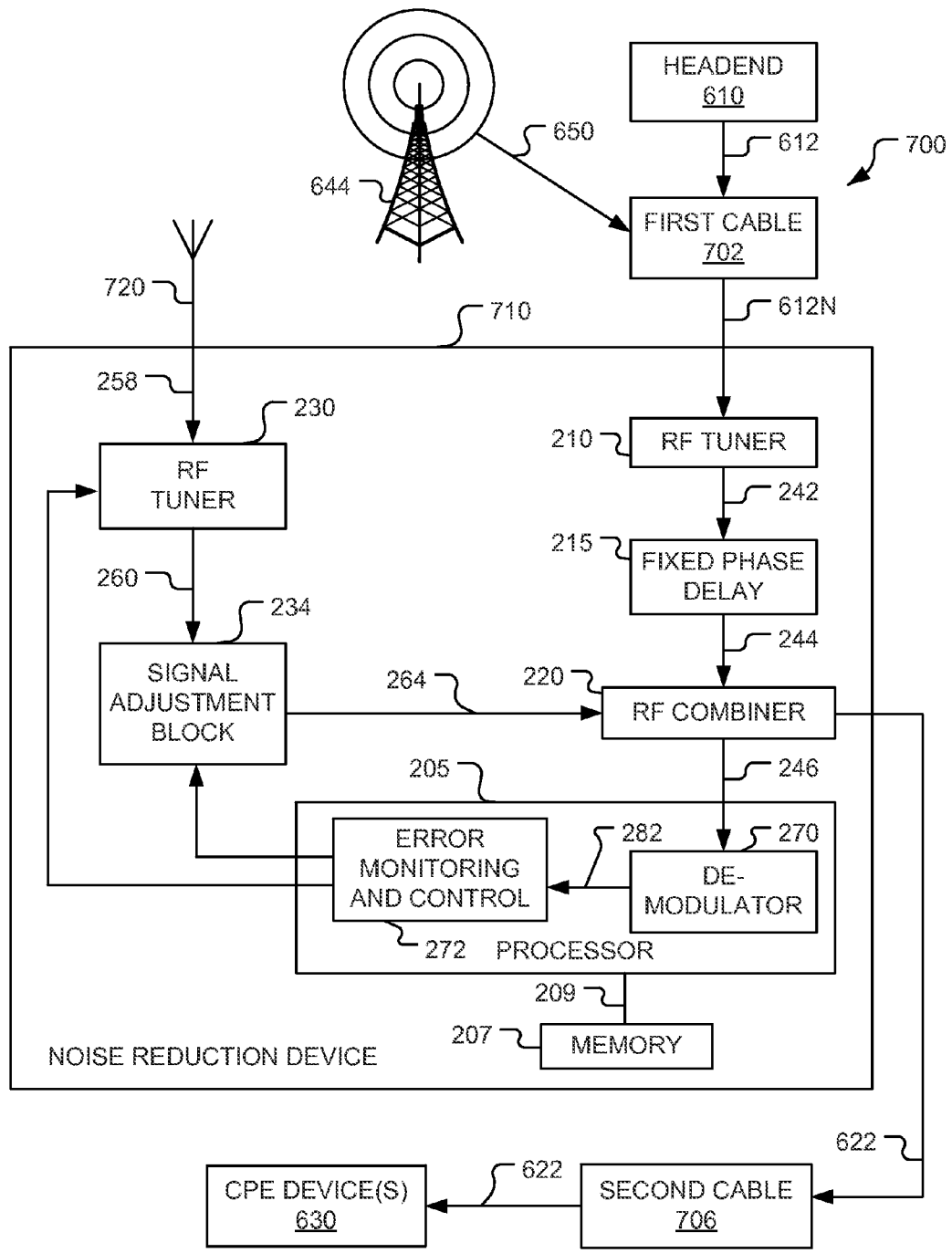
FIG. 7 is a block diagram of a portion of the outside plant connected to a noise reduction device.

As mentioned above, different portions of the outside plant 620 may receive different interfering signals. FIG. 7 depicts a non-limiting example of a portion 700 of the outside plant 620. The portion 700 includes a first cable 702 that receives the original cable signal (illustrated by arrow 612) from the headend 610 (directly or via one or more intervening components) and conducts a noisy cable signal (illustrated as arrow 612N) to a noise reduction device 710. The portion 700 also includes a second cable 706 that receives the delivered cable signals (illustrated as arrow 622) from the noise reduction device 710 and conducts the delivered cable signals to one or more of the CPE devices 630. For ease of illustration, the first cable 702 will be described as receiving the interfering signal (illustrated as arrow 650) from the radio tower 644. Thus, the noisy cable signal (illustrated as arrow 612N) includes both the original cable signal (illustrated by arrow 612) and the interfering signal (illustrated as arrow 650).

An antenna 720 may be positioned to receive a copy of the interfering signal (illustrated as arrow 650). For example, the antenna 700 may be positioned at or near a location in the outside plant 620 experiencing interference. In this example, the antenna 720 is positioned near the first cable 702 at a location whereat the antenna can receive wireless signals generated by the radio tower 644. The signal received by the antenna 720 will be referred to as the copy signal (illustrated as arrow 258). The antenna 720 may be connected to or a component of the noise reduction device 710. The antenna 720 may be substantially identical to the antenna 225 (see FIG. 1) of the CPE device 110. The antenna 720 may be configured for outdoor use and/or configured to receive wireless signals of the type typically received by the outside plant 620.

Like reference numerals have been used in FIGS. 1 and 7 to identify like components of the CPE device 110 and the noise reduction device 710, respectively. Like the CPE device 110, the noise reduction device 710 includes the processor 205, the memory 207, the first RF tuner 210, the fixed phase delay 215, the RF combiner 220, the second RF tuner 230, and the signal adjustment block 234.

The first RF tuner 210 determines the frequency or frequencies on which the noise reduction device 710 receives the noisy cable signal (illustrated as arrow 612N). The first RF tuner 210 supplies the received cable signal to the fixed phase delay 215 as the RF signal (illustrated as arrow 242). The fixed phase delay 215 delays the RF signal (illustrated as arrow 242) by a fixed amount, and outputs the phase delayed signal (illustrated as arrow 244) to the RF combiner 220. For ease of illustration, the phase delayed signal (illustrated as arrow 244) will be referred to as a processed cable signal. As will be described in detail below, the RF combiner 220 outputs the combined signal (illustrated as arrow 246) to the processor 205. The RF combiner 220 also outputs the same combined signal as the delivered cable signal (illustrated as arrow 622) to the second cable 706.

The antenna 720 supplies the copy signal (illustrated as arrow 258) to the second RF tuner 230. The second RF tuner 230 determines the frequency or frequencies on which the noise reduction device 710 receives the copy signal (illustrated as arrow 258), and supplies the received copy signal to the signal adjustment block 234 as the RF signal (illustrated as arrow 260). The signal adjustment block 234 adjusts the RF signal (illustrated as arrow 260), and outputs the processed copy signal (illustrated as arrow 264) to the RF combiner 220. The RF combiner 220 combines the processed copy signal (illustrated as arrow 264) with the processed cable signal (illustrated as arrow 244) to produce the combined signal (illustrated as arrow 246) that is supplied to the processor 205, and supplies the same combined signal to the second cable 706 as the delivered cable signal (illustrated as arrow 622).

The processor 205 receives the combined signal (illustrated as arrow 246) from the RF combiner 220, and adjusts the processed copy signal (illustrated as arrow 264) to at least partially cancel out the interfering signal (illustrated as arrow 650). The demodulator 270 demodulates the combined signal (illustrated as arrow 246) to produce a data stream (not shown). The demodulator 270 may calculate the series of error rate values (illustrated as arrow 282) and send them to the error monitoring and control block 272 as an error rate signal.

The error monitoring and control block 272 monitors the error rate values of the combined signal (illustrated as arrow 246), and determines whether to modify the processed copy signal (illustrated as arrow 264) in a manner that at least partially cancels the interfering signal (illustrated as arrow 650) present in the combined signal to thereby reduce the error rate values of the combined signal. The error monitoring and control block 272 may modify the processed copy signal (illustrated as arrow 264) in any manner described above with respect to modifying the processed copy signal illustrated as arrow 264 in FIG. 1.

For example, the error monitoring and control block 272 of the noise reduction device 710 may perform the method 300 illustrated in FIG. 2 to continuously monitor the combined signal (illustrated as arrow 246), and when appropriate, adjust the copy signal based on the error rate values of the combined signal. When the error monitoring and control block 272 of the noise reduction device 710 performs the method 300, the processed copy signal (illustrated as arrow 264) is modified to at least partially cancel the interfering signal illustrated as arrow 650 (instead of the interfering signal illustrated as arrow 254 in FIG. 1). In block 325, the error monitoring and control block 272 may instruct the signal adjustment block 234 to set the amount of attenuation of the copy signal (illustrated as arrow 258) such that the signal energy of the copy signal is approximately equal to the average signal energy of the interfering signal (illustrated as arrow 650) received by the noise reduction device 710 at the operating frequency. Optionally, the method 330 illustrated in FIG. 3 or the method 400 illustrated in FIG. 5 may be performed in block 326 of the method 300. If at any point during the noise cancellation process 327 portion of the method 300, the signal energy of the copy signal (illustrated as arrow 258) received by the antenna 720 goes to zero (or falls below a predefined threshold value), the error monitoring and control block 272 may return to block 310.

Multiple noise reduction devices like the noise reduction device 710 may be coupled to portions of the outside plant 620 to reduce noise.

The noise reduction device 710 and/or the CPE device 110 may be used by cable television multi-service operators to enable them to continue to use frequency spectrum that is also occupied by wireless transmitters (e.g., the radio tower 644). This allows cable television multi-service operators to provide revenue generating services on the impacted frequencies, and therefore may provide financial benefits for such operators.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A device for use with a cable signal distributed by an outside plant of a cable system, and an interfering radio frequency ("RF") signal generated by one or more external wireless signal sources and received by the outside plant, the outside plant combining the interfering RF signal with the cable signal to produce a noisy cable signal, the device comprising:

an antenna configured to receive the interfering RF signal as a copy signal; and
a signal processing system comprising:
a signal processing chain configured to receive the noisy cable signal and the copy signal,
at least one signal adjustment component configured to modify at least one signal parameter of the copy signal to produce a processed copy signal, the signal processing chain being configured to combine the noisy cable signal and the processed copy signal to produce a combined signal,
an error detection component configured to determine error rate values for the combined signal,
a monitoring component configured to monitor the error rate values of the combined signal, and determine when the error rate values are increasing, and the copy signal comprises more than a threshold amount of signal energy, the monitoring component being further configured to instruct the at least one signal adjustment component to adjust the at least one signal parameter of the copy signal after the monitoring component has determined that the error rate values are increasing, and the copy signal comprises more than the threshold amount of signal energy, the at least one signal adjustment component adjusting the at least one signal parameter of the copy signal such that the copy signal at least partially cancels the interfering RF signal in the combined signal thereby reducing the error rate values of the combined signal.

2. The device of claim 1, wherein the signal processing system is further configured to output the combined signal to the outside plant.

3. The device of claim 1, wherein the at least one signal parameter of the copy signal comprises an amount of phase shift; and
the at least one signal adjustment component comprises a phase adjustment component configured to adjust the amount of phase shift of the copy signal.

4. The device of claim 3, wherein the amount of phase shift of the copy signal is adjusted to shift the copy signal to be approximately 180 degrees out of phase with respect to the interfering RF signal.

5. The device of claim 1, wherein the at least one signal parameter of the copy signal comprises amplitude; and
the at least one signal adjustment component comprises an amplitude adjustment component configured to adjust the amplitude of the copy signal.

6. The device of claim 5, wherein the at least one signal parameter of the copy signal comprises an amount of phase shift; and
the at least one signal adjustment component comprises a phase adjustment component configured to adjust the amount of phase shift of the copy signal.

7. The device of claim 6, wherein the amount of phase shift of the copy signal is adjusted to shift the copy signal to be approximately 180 degrees out of phase with respect to the interfering RF signal; and
the amplitude of the copy signal is adjusted to approximately match the amplitude of the interfering RF signal.

8. The device of claim 1, wherein the at least one signal parameter of the copy signal comprises an amount of attenuation; and
the at least one signal adjustment component comprises an adjustable attenuation component configured to adjust the amount of attenuation of the copy signal.

9. A device for use with a cable signal distributed by an outside plant of a cable system, and an interfering radio frequency ("RF") signal generated by one or more external wireless signal sources and received by the outside plant, the outside plant combining the interfering RF signal with the cable signal to produce a noisy cable signal, the device comprising:
an antenna configured to receive the interfering RF signal as a copy signal;
at least one signal adjustment component configured to adjust at least one signal parameter of the copy signal to produce a processed copy signal;
a signal processing chain configured to receive and combine the noisy cable signal and the processed copy signal to produce a combined signal;
at least one processor; and
a memory connected to the at least one processor, the memory storing instructions executable by the at least one processor that when executed thereby implement a method comprising:
determining error rate values for the combined signal;
determining when the error rate values are increasing;
determining when the copy signal comprises more than a threshold amount of signal energy; and
when it is determined that the error rate values are increasing, and the copy signal comprises more than a threshold amount of signal energy, instructing the at least one signal adjustment component to adjust the at least one signal parameter of the copy signal such that the error rate values for the combined signal decrease.

10. The device of claim 9, wherein the at least one signal parameter of the copy signal comprises an amount of attenuation, and
the at least one signal adjustment component comprises an adjustable attenuation component configured to adjust the amount of attenuation of the copy signal.

11. The device of claim 9, wherein the at least one signal parameter of the copy signal comprises an amount of phase shift; and
the at least one signal adjustment component comprises a phase adjustment component configured to adjust the amount of phase shift of the copy signal.

12. The device of claim 11, wherein the at least one signal parameter of the copy signal comprises amplitude; and
the at least one signal adjustment component comprises an amplitude adjustment component configured to adjust the amplitude of the copy signal.

13. A cable system for use with interfering radio frequency ("RF") signals generated by one or more external wireless signal sources, the cable system comprising:
an outside plant, each of a plurality of different portions of the outside plant combining at least a portion of the interfering RF signals with the cable signal to produce a noisy cable signal, each of the plurality of different portions of the outside plant comprising a corresponding different noise reduction device comprising:
an antenna configured to receive a portion of the interfering RF signals as a copy signal; and
a signal processing system comprising:
a signal processing chain configured to receive the copy signal from the antenna, and the noisy cable signal produced by the portion of the outside plant corresponding to the noise reduction device,
at least one signal adjustment component configured to modify at least one signal parameter of the copy signal to produce a processed copy signal, the signal processing chain being configured to combine the noisy cable signal received thereby with the processed copy signal to produce a combined signal, an error detection component configured to determine error rate values for the combined signal, a monitoring component configured to monitor the error rate values of the combined signal, and determine when the error rate values are increasing and the copy signal comprises more than a threshold amount of signal energy, the monitoring component being further configured to instruct the at least one signal adjustment component to adjust the at least one signal parameter of the copy signal to reduce the error rate values of the combined signal after the monitoring component has determined that the error rate values are increasing, and the copy signal comprises more than the threshold amount of signal enemy.

14. The system of claim 13, wherein the signal processing system is further configured to output the combined signal to the portion of the outside plant.

15. A method for use with a cable signal provided by a cable system, and an interfering radio frequency ("RF") signal generated by one or more external wireless signal sources, the cable system comprising an outside plant that combines the interfering RF signal with the cable signal to produce a noisy cable signal, the method being performed by a device connected to the outside plant, the device comprising a memory, a processor, signal processing components, and an antenna, the method comprising:

receiving, at the antenna of the device, the interfering RF signal as a copy signal;

processing, by at least a first portion of the signal processing components, the copy signal to produce a processed copy signal;

receiving, by at least a second portion of the signal processing components, the noisy cable signal;

combining, by at least a third portion of the signal processing components, the cable signal and the processed copy signal to produce a combined signal;

outputting the combined signal to the outside plant;

determining, by the processor, error rate values for the combined signal;

determining, by the processor, whether the error rate values are increasing;

determining, by the processor, whether the copy signal comprises more than a threshold amount of signal energy; and when the processor determines that the error rate values are increasing and the copy signal comprises more than the threshold amount of signal energy, instructing, by the processor, the first portion of the signal processing components to modify the processing of the copy signal to change a value of at least one signal parameter of the copy signal to reduce the error rate values of the combined signal.

16. The system of claim 13, wherein the at least one signal parameter of the copy signal comprises an amount of phase shift; and the at least one signal adjustment component comprises a phase adjustment component configured to adjust the amount of phase shift of the copy signal.

17. The system of claim 16, wherein the amount of phase shift of the copy signal is adjusted to shift the copy signal to be approximately 180 degrees out of phase with respect to the interfering RF signal.

18. The system of claim 13, wherein the at least one signal parameter of the copy signal comprises amplitude; and the at least one signal adjustment component comprises an amplitude adjustment component configured to adjust the amplitude of the copy signal.

19. The system of claim 18, wherein the at least one signal parameter of the copy signal comprises an amount of phase shift; and the at least one signal adjustment component comprises a phase adjustment component configured to adjust the amount of phase shift of the copy signal.

20. The system of claim 19, wherein the amount of phase shift of the copy signal is adjusted to shift the copy signal to be approximately 180 degrees out of phase with respect to the interfering RF signal; and the amplitude of the copy signal is adjusted to approximately match the amplitude of the interfering RF signal.

21. The system of claim 13, wherein the at least one signal parameter of the copy signal comprises an amount of attenuation; and the at least one signal adjustment component comprises an adjustable attenuation component configured to adjust the amount of attenuation of the copy signal.

* * * * *